Aug. 16, 1960     S. P. KISSINGER     2,949,171
EMERGENCY BRAKE CONTROLLING APPARATUS
Filed Oct. 14, 1957     2 Sheets-Sheet 2

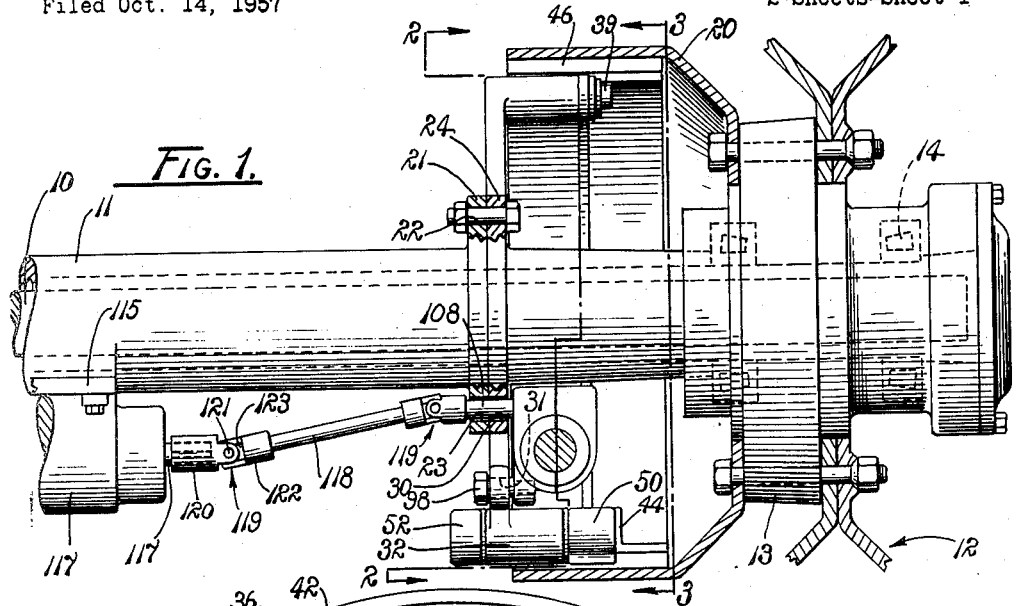

INVENTOR
STANLEY P. KISSINGER
ATTORNEYS
HUEBNER, BEEHLER & WORREL
BY

United States Patent Office 2,949,171
Patented Aug. 16, 1960

2,949,171

EMERGENCY BRAKE CONTROLLING APPARATUS

Stanley P. Kissinger, 1504 S. Main St., Milpitas, Calif.

Filed Oct. 14, 1957, Ser. No. 689,791

9 Claims. (Cl. 188—106)

The present invention relates to an emergency brake controlling apparatus and more particularly to such an emergency apparatus which can easily be incorporated in a conventional brake mechanism and which does not interfere with the normal operation thereof.

Conventional brake mechanisms for automobile and truck wheels usually include a cylindrical brake drum mounted for rotation with each wheel, pairs of semi-cylindrical brake shoes mounted on opposite sides of an axle housing for pivotal movement inwardly and outwardly between expanded and contracted positions, brake lining positioned between the brake shoes and the brake drums and compressed therebetween incident to brake shoe expansion, and cams positioned between free ends of the brake shoes for urging them into expanded positions and releasing them for spring contraction. The cams are controlled by linkages connected to a foot pedal or hand lever of the vehicle. When the brake lining wears out there is brake failure and the cam is normally ineffective to apply the brakes in such a manner as to stop the vehicle. This also can result from excessive heating and expansion of the brake drums so that proper shoe engagement cannot be attained.

Failure of conventional brakes has frequently been experienced on trucks, truck-trailers, or semi-trucks especially when carrying heavy loads. This usually occurs when the truck is descending a steep grade requiring repeated application of the brakes necessary to maintain a controllable speed. Runaway trucks, as a result of brake failure, have caused the loss of many lives, not only those of the truck drivers but also of other motorists in the paths of the trucks, and the loss of much valuable cargo. Although this problem has long been known and widely publicized, the problem is still evident.

Accordingly, it is an object of the present invention to provide an improved emergency brake controlling apparatus.

Another object is to provide such an apparatus especially adapted for use on trucks and similar vehicles.

Another object is to improve safety on the highways.

Another object is to prevent runaway trucks or at least to reduce their frequency of occurrence.

Another object is to prevent the loss of life and cargo as a result of runaway trucks.

Another object is to provide an auxiliary apparatus for applying the brakes and locking the wheels against rotation when the normal brakes fail.

Another object is to provide an emergency brake controlling apparatus which can be installed in conventional brake mechanisms.

Another object is to provide an emergency apparatus of the nature described which does not interfere with the normal operation of the regular brakes.

Another object is to provide an emergency brake applying device which develops great force to urge the brake shoes into brake drum engagement.

Another object is to provide an emergency apparatus, as described above, which is easily adjustable.

Other objects are to provide an emergency brake controlling apparatus which is simple to manufacture and use, compact, adapted for use in a variety of brake mechanisms, which is remotely controllable, and which is economical, dependable and durable.

These, together with other objects, will become more fully apparent upon reference to the following description.

In the drawings:

Fig. 1 is a fragmentary side view of an axle housing and brake mechanism, partialy in section, and showing the emergency brake controlling apparatus of the present invention incorporated therein.

Fig. 2 is a somewhat enlarged transverse section with parts broken away taken on a plane at a position represented by line 2—2 of Fig. 1.

Figure 3:
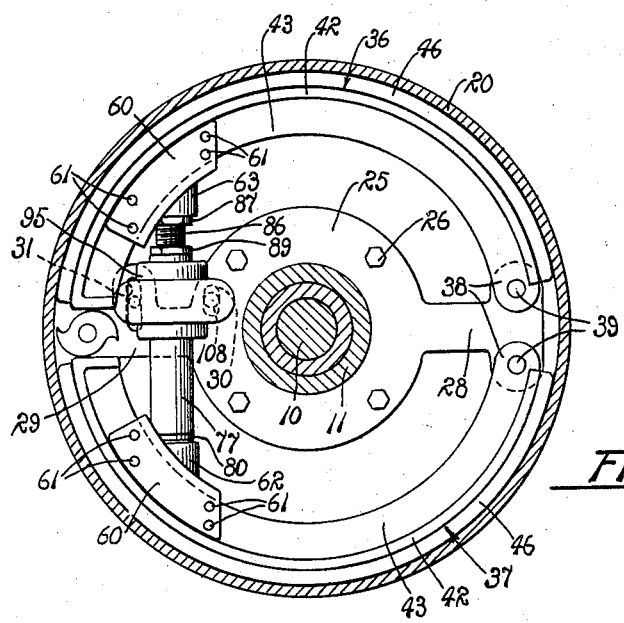
Fig. 3 is a transverse section taken on a plane at a position represented by line 3—3 of Fig. 1.

Referring more particularly to the drawings, an elongated cylindrical axle 10 is fragmentarily illustrated in Fig. 1. The axle is enclosed by an axle housing 11, and a wheel 12 including a hub 13 is rotatably mounted on the axle by means of a plurality of roller bearings 14. Obviously driving wheels, not shown, may similarly be equipped.

An annular, brake drum 20 is connected to the hub 13 of the wheel 12 and has a cylindrical portion extended in concentric circumscribing relation to the axle housing inwardly of the wheel. An annular housing flange 21 is radially outwardly extended from the axle housing 11 and provides a plurality of bolt holes 22 and an elongated worm shaft aperture 23. A mounting flange 24 is also radially outwardly extended from the axle housing adjacent to the housing flange and includes a central portion 25 in face-to-face contact with the housing flange and connected thereto by means of bolts 26 extended through the holes 22 and said central portion, and nuts 27 screw-threaded on the bolts. The mounting flange has a pivot arm 28 radially extended from the central portion and a guiding arm 29 radially extended from the central portion substantially diametrically of the pivot arm. The guiding arm has an elongated worm shaft opening 30 in registration with the aperture 23. Further, the guiding arm provides an elongated slot 31 substantially tangential to a circle concentric to the axle 10, and a bushing portion 32 providing a bore in substantially parallel relation with the axle and outwardly of the slot.

Semi-circular, T-shaped brake shoes 36, of conventional construction, are arranged in opposed relation on opposite sides of the axle housing 11 in substantially circumscribing relation thereto and provide mounted ends 38 pivotally connected to the pivot arm 28 of the mounting flange 24 by means of anchor pins 39 extended parallel to the axle 10. The brake shoes also provide actuating ends 40 in adjacent spaced relation and substantially diametrically opposite to the mounted ends. Each brake shoe has a cylindrical compressing rim 42 in circumferentially spaced relation to the brake drum 20, an inwardly radially extended web 43, and a radial end flange 44 at its actuating end. Brake linings 46 are positioned between the brake drum 20 and each rim 42.

An S-shaped cam 50 is positioned between the actuating ends 40 of thet brake shoes 36 and 37 and is secured to a cam shaft 51 extended away from the brake shoes in parallel relation to the axle 10. The cam shaft is rotatably journaled in the bushing 32 and is connected to a lever 52 which, in turn, is connected through a system of linkages to a foot pedal or hand lever, none of which are shown, for rotating the cam. When the cam is in the position shown in Fig. 2, the brake shoes are in their contracted positions but when the cam is rotated, the brake shoes are outwardly expanded to compress the linings 46 against the brake drum 20 to apply the brakes.

The emergency brake controlling apparatus of the present invention provides a pair of channel-shaped end clamps 60 individually fitted over the webs 43 of the brake shoes 36 and 37 and secured thereto by bolts 61. It is to be noted that the clamps are located in adjacent spaced relation to the actuating ends 40 of the shoes. End receptacles 62 and 63 are individually secured, as by welding, to the sides of the clamps and provide facing recesses 64 and 65, respectively. The recess 64 is semi-cylindrical and the recess 65 is hemispherical for reasons which will soon become apparent. The receptacles are located on the same side of the clamps and thus the brake shoes 36 and 37, and the recesses are substantially aligned along a cord of a circle defined by the brake shoes.

The controlling apparatus includes a telescopically adjustable member 70 having an inner bracing screw 71 providing an annular end shoulder 72, a semi-cylindrical extended end key 73 separably, complementarily, pivotally, non-rotatably fitted in the semi-cylindrical recess 64, and a screw-threaded shank 74. A cylindrical outer sleeve 77 provides an end portion 78 screw-threaded on the shank of the bracing screw and an opposite end portion 79. A washer 80 is positioned between the end of the sleeve and the shoulder 72.

An inner adjusting screw 85 includes a threaded shank 86 screw-threaded in the end portion 79 of the sleeve, a wrench head 87, and a fractionally spherical ball 88 separably, complementarily, universally fitted in the hemispherical recess 65. A lock nut 89 is screw-threaded on the shank against the end 79 of the sleeve thereby non-rotatably to connect the adjusting screw to the sleeve.

Figure 4:
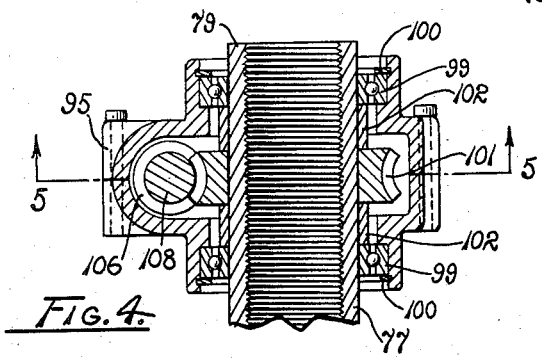
Fig. 4 is a somewhat enlarged, fragmentary longitudinal section of a portion of the brake controlling apparatus.
Figure 6:
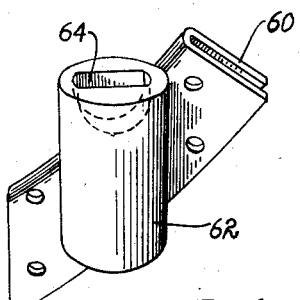
Fig. 6 is a somewhat enlarged perspective view of one of the end clamps and receptacles employed in the emergency controlling apparatus.
Figure 5:
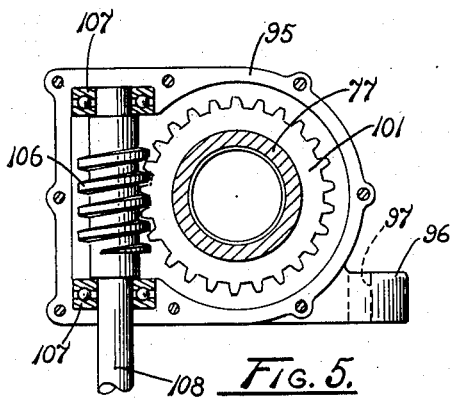
Fig. 5 is a fragmentary transverse section taken on a plane at a position represented by line 5—5 of Fig. 4.

As best seen in Figs. 4 and 5, a split casing 95 is fitted in circumscribing relation to the sleeve 77 and includes an outwardly extended ear 96 providing a threaded bore 97 aligned with the slot 31 in the guiding arm 29. A guide bolt 98 is extended through the slot and is screw-threaded into the bore. It is to be noted that the bolt is substantially parallel to the axle 10. A pair of spaced roller bearings 99 are mounted in the casing in circumscribing relation to the sleeve and held within the casing by means of snap rings 100. A spur gear 101 is rigidly secured in circumscribing relation on the sleeve between the roller bearings and is spaced from the latter by means of tubular spacers 102. It will be evident that the sleeve 77 is mounted for relative rotational movement within the casing by means of the roller bearings. By particular reference to Fig. 5, it will be noted that a worm gear 106 is enclosed within the casing 96 in mesh with the annular gear 101 and journaled for rotation by means of roller bearings 107 fitted within the casing. The worm gear has a worm shaft 108 outwardly extended in parallel relation to the axle through the aligned aperture 23 and opening 30 of the housing and mounting flanges 21 and 24. The worm shaft is thereby movable longitudinally of the aperture and the opening along a path parallel to the sleeve 77.

A mounting platform 115 is rigidly connected to the axle housing 11 in longitudinally spaced relation to the housing flange 21, and an electric motor 116 is connected to the platform. The motor provides an output shaft 117 parallel to the axle 10, and a connecting shaft 118 connects the output shaft of the motor to the worm shaft 108 by means of splined couplings 119. The couplings have holding portions 120 rigidly secured to the output shaft and worm shaft and mounting pins 121 transversely of their respective shafts. The couplings also have slide portions 122 rigidly secured to the opposite ends of the connecting shaft which provide longitudinal slots 123 slidably receiving the pins of their respectively adjacent holding portions. Rotation of the output shaft causes rotation of the worm shaft but the couplings permit limited relative longitudinal and pivotal or articulated movement of the shafts.

*Operation*

The operation of the described embodiment of the subject invention is believed to be readily apparent and is briefly summarized at this point.

The emergency brake controlling apparatus is very conveniently installed in conventional brake mechanisms. Thus, after providing the aperture 23, the opening 30, the slot 31, and the bolt holes in the brake shoe webs 43, the conventional brake mechanism is conditioned for insertion of the emergency apparatus. The clamps 60 are first attached to the brake shoes 36 and 37. The telescopically adjustable member 70 is prepared for installation by loosening the lock nut 89 and threading the adjusting screw 85 inwardly of the sleeve 77. Further, the coupling 119 on the worm shaft 108 is disconnected. The end key 73 is then fitted into the recess 64 and the ball 88 aligned with the recess 65. Further, the worm shaft 108 is extended through the aperture 23 and bore 30. The bolt 98 is extended through the slot 31 and threaded into the bore 97, and the coupling 119 on the worm shaft is connected. Finally, the adjusting screw 85 is threaded out of the sleeve and the ball fitted into its recess 65, and the lock nut tightened down against the sleeve.

During normal operation, the brake shoes 36 and 37 are expanded by rotation of the cam 50 in the usual manner. It is significant that neither end portion 73 nor 88 of the adjustable member 70 is inseparably connected to its adjacent brake shoe but, rather, is readily separable therefrom simply by relative movement away from each other. As such, the telescopic member does not prevent or otherwise interfere with expansion or contraction of the shoes incident to cam rotation.

However, if the brake linings 46 become so worn or burned out that the cam 50 is unable to cause frictional contact of either the linings or the brake shoes 36 and 37 with the brake drum 20, the apparatus of the present invention may be brought into use. The motor 116 is energized, preferably from a remote location as in the cab of the vehicle, not shown, for example. This turns the worm 106 through the connecting shaft 118 and thus rotates the sleeve 77 in a direction to thread the sleeve outwardly off of the bracing screw 71. It is to be remembered that the lock nut 89 prevents relative rotation of the adjusting screw in the sleeve. This applies force axially of the screws and outwardly against the brake shoes 36 and 37 to move them toward and into engagement with the brake drum 20. It will be evident that the telescopically adjustable member 70 can exert very great force and is capable of locking the brake drum against rotation relative to the brake shoes by providing metal-to-metal contact therebetween. Inasmuch as the brake shoes pivot around axes defined by the pins 39, the end key 73 and the ball 88 moving in their respective recesses 64 and 65 enable and accommodate for such movement without bind on the screws 71 or 85 and the sleeve 77. The semi-cylindrical key fitted in the semi-cylindrical recess precludes rotation of the bracing screw relative to the brake shoe 37 but permits pivotal movement of the telescopic member in a plane parallel to the brake shoes and generally normal to the anchor pins 39. In contrast, the ball fitted in the fractionally spherical recess enables free rotation of the unitarily acting sleeve and adjusting screw while also accommodating pivotal movement of the telescopic member in a plane normal to the axis of the semi-cylindrical recess 64. Further, it is to be noted that the couplings 119 accommodate limited movement of the worm shaft 108 with the casing 95 along a path axially parallel to the sleeve 77.

When the vehicle in which the apparatus is employed has been stopped by the emergency apparatus, the brake shoes 36 and 37 may be contracted by threading the sleeve 77 back onto the bracing screw 71. This can be effected in several ways. For example, the motor 116 can be of the reversible type whereby retraction of the shoes is effected by energizing the motor to rotate its output shaft 117 in an opposite direction to that in which it is rotated for expanding the shoes. If it is preferred to use a unidirectional motor, the lock nut 89 may be threaded away from the sleeve, the adjusting screw 85 threaded into the sleeve by the head collar 87, and the lock nut again tightened. It is apparent that the latter would only be a temporary expedient for contracting the telescopically adjustable member. Of course this would suffice in most instances since the apparatus is designed for use in conditions of extreme emergency whereupon after application of the brake by the subject apparatus the normal brakes are overhauled.

From the foregoing it will be evident that an emergency controlling apparatus has been provided which is very easily and quickly installed in a conventional brake mechanism, which does not interfere with the normal operation of conventional brakes, and which is capable of developing great force under emergency conditions for locking a brake drum to the brake shoes.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a support, a pair of elongated controlled elements, and means pivotally mounting the elements in the support for movement toward and away from each other; an apparatus for controlling movement of said elements comprising receptacles connected to the elements and having opposed recesses, one of the recesses being substantially semi-cylindrical and the other recess being fractionally spherical, said semi-cylindrical recess being substantially concentric to an axis parallel to the pivot axis of one of the elements; a telescopically adjustable control member including a first end portion having a substantially semi-cylindrical end key complementarily movably fitted in the semi-cylindrical recess for pivotal movement around the axis of the semi-cylindrical recess but being locked against rotation relative to its receptacle, and a second end portion expansible and contractible relative to the first end portion having a fractionally spherical ball-shaped end complementarily universally fitted in the fractionally spherical recess; and means connected to the control member for effecting expansion and contraction thereof.

2. In combination with an elongated housing having a longitudinal axis; an annular brake drum mounted in circumscribing concentric relation on the housing; a pair of substantially semi-circular brake shoes substantially concentric to said axis on opposite sides of the housing having adjacent mounting ends, and adjacent actuating ends substantially diametrically opposite to the mounting ends; and means pivotally mounting the shoes on the housing for individual pivotal movement around axes substantially parallel to said longitudinal axis between expanded and contracted positions toward and away from the brake drum; an emergency brake controlling apparatus comprising clamps mounted on the shoes adjacent to their actuating ends; receptacles individually mounted on the clamps having opposed inwardly opening sockets, one of the sockets being substantially semi-cylindrical and having an axis substantially parallel to said longitudinal axis, and the other socket being fractionally spherical; an inner bracing screw including a threaded shank, and a semi-cylindrical end key complementarily releasably pivotally fitted in the semi-cylindrical socket; a substantially cylindrical outer sleeve having an end screw-threadably receiving the shank of the screw and an oppositely extended end; a ball-shaped end member releasably complementarily universally movably fitted in the fractionally spherical socket; means mounting the end member on the extended end of the sleeve; an annular driven gear rigidly mounted in circumscribing relation concentrically on the housing; a worm drive gear in mesh with the driven gear including a worm shaft; means rotatably borne by the sleeve journaling the worm gear for rotatable movement; a motor including an output shaft; and an articulated longitudinally extendible and contractible linkage interconnecting the output and worm shafts whereby energization of the motor rotates the sleeve on the bracing screw to expand the brake shoes outwardly toward the brake drum.

3. In combination with an axle housing having a longitudinal axis; a cylindrical brake drum mounted in circumscribing concentric relation to the housing; a pair of substantially semicircular brake shoes substantially concentric to said axis on opposite sides of the housing having adjacent mounting ends, and adjacent actuating ends substantially diametrically opposite to the mounting ends; and means pivotally mounting the shoes on the housing for individual pivotal movement around axes substantially parallel to said longitudinal axis between expanded and contracted positions toward and away from the brake drum; an emergency brake controlling apparatus comprising clamps mounted on the shoes adjacent to their actuating ends; receptacles individually mounted on the clamps having opposed inwardly opening sockets, one of the sockets being substantially semi-cylindrical and having an axis substantially parallel to said longitudinal axis, and the other socket being fractionally spherical; an inner bracing screw including a threaded shank, and a semi-cylindrical end key complementarily releasably pivotally fitted in the semi-cylindrical socket; an inner adjusting screw including a threaded shank axially aligned with the shank of the bracing screw, and a fractionally spherical ball releasably complementarily, universally movably fitted in the fractionally spherical socket; a substantially cylindrical outer sleeve having opposite ends screw-threadably receiving the shanks of the screws; a lock nut on the shank of the adjusting screw and adjustably tightened down against an end of the sleeve for precluding relative rotation between such shank and sleeve; an annular driven gear rigidly mounted in circumscribing relation concentrically on the housing; a worm drive gear in mesh with the driven gear including a worm shaft; means rotatably borne by the sleeve journaling the worm shaft for rotatable movement; a motor mounted on the axle housing including an output shaft; an articulated longitudinally extendible and contractible linkage interconnecting the output and worm shafts whereby energization of the motor rotates the sleeve and the adjusting screw endwardly relative to the bracing screw to expand the brake shoes outwardly toward the brake drum.

4. In combination with an axle housing having a longitudinal axis; an annular brake drum mounted in circumscribing concentric relation on the housing; a pair of substantially semi-circular brake shoes substantially concentric to said axis on opposite sides of the housing having semi-cylindrical rims in circumferentially spaced relation to the brake drum, webs inwardly radially extended from the rims, adjacent mounting ends, and adjacent actuating ends substantially diametrically opposite to the mounting ends; means pivotally mounting the shoes on the housing for individual pivotal movement around axes substantially parallel to said longitudinal axis between expanded and contracted positions toward and away from the brake drum; and a cam rotatably mounted on the brake drum and positioned between the actuating ends of the shoes for rotation in engagement with said actuating ends to expand the shoes and to permit contraction thereof; an emergency brake controlling apparatus comprising a pair of channel-shaped clamps fitted on the webs of the shoes adjacent to their actuating ends; bolts extended through the clamps and the webs; receptacles individually mounted on the clamps having opposed inwardly opening sockets, one of the sockets being substantially semi-cylindrical and having an axis substantially parallel to said longitudinal axis, and the other socket being fractionally spherical; an inner bracing screw including a threaded shank, a transverse end shoulder, and a semi-cylindrical end key complementarily releasably pivotally fitted in the semi-cylindrical socket; an inner adjusting screw including a threaded shank axially aligned with the shank of the bracing screw, and a frictionally spherical ball releasably complementarily, universally movably fitted in the fractionally spherical socket; a substantially cylindrical outer sleeve having opposite ends screw-threadably receiving the shanks of the screws; a lock nut on the shank adjusting screw and adjustably tightened down against an end of the sleeve for precluding relative rotation between such shank and sleeve; an annular driven gear rigidly mounted in circumscribing relation concentrically on the housing; a worm drive gear in mesh with the driven gear including a worm shaft; means rotatably borne by the sleeve journaling the worm gear for rotatable movement; a motor mounted on the axle housing including an output shaft; and an articulated longitudinally extendible and contractible linkage interconnecting the output and worm shafts whereby energization of the motor rotates the sleeve and the adjusting screw endwardly relative to the bracing screw to expand the brake shoes outwardly toward the brake drum, said releasable fitting of the key and ball in their respective sockets permitting normal expansion and contraction of the brake shoes by the cam.

5. In combination with a support, a pair of elongated controlled elements, and means pivotally mounting the elements in the support for movement toward and away from each other; an apparatus for controlling movement of said elements comprising receptacles connected to the elments and having opposed recesses, one of the recesses being substantially semi-cylindrical and being substantially concentric to an axis parallel to the pivot axis of one of the elements; a telescopically adjustable control member including a first end portion having a substantially semi-cylindrical end key complementarily separably movably fitted in the semi-cylindrical recess for pivotal movement around the axis of the semi-cylindrical recess but being locked against rotation relative to its receptacle, and a second end portion expansible and contractible relative to the first end portion, the second end portion including means freely separably fitted into the other recess for pivotal movement of said second end portion about an axis substantially parallel to said pivot axis, and means connected to the control member for effecting expansion and contraction thereof.

6. In a brake mechanism, a support; a brake drum mounted on the support; a pair of brake shoes pivotally mounted in the support in opposed relation for movement in opposite directions toward and away from the drum between expanded and contracted positions; a cam rotatably mounted in the support engaging the shoes having a neutral position when the shoes are contracted and a brake applying position urging the shoes into expanded position; and an emergency brake controlling apparatus including an elongated longitudinally telescopically adjustable control member having opposite screw-threaded end portions relatively rotatable around a longitudinal axis for the control member for movement between expanded and contracted positions; a pair of sets of freely releasably interfitted elongated male and female coupling members individually rigidly connected to the opposite end portions of the control member and to the respective brake shoes, one set of interfitted male and female coupling members being non-rotatable with respect to each other, and each set of male and female coupling members being movable a predetermined distance relative to each other axially of the control member between a fully coupled position and a completely separated position, said predetermined distance being greater than the distance traveled by each brake shoe in moving between expanded and contracted positions whereby normal operation of the cam does not completely separate the coupling members; and means connected to the control member for moving the end portions thereof into expanded position and thereby to move the brake shoes into expanded positions.

7. The mechanism of claim 6 wherein said coupling members are transversely movable relative to each other about axes substantially parallel to the pivot axes of the brake shoes for accommodating movement of the brake shoes between expanded and contracted position.

8. The mechanism of claim 6 wherein each of the female and male coupling members in said one set of coupling members is of substantially rectangular cross section in a plane normal to said longitudinal axis.

9. The mechanism of claim 6 wherein the male and female coupling members of said one set of coupling members have a substantially semi-cylindrical shape substantially concentric to an axis disposed transversely of said longitudinal axis and substantially parallel to the pivot axes of the brake shoes.

References Cited in the file of this patent

UNITED STATES PATENTS

| | | |
|---|---|---|
| Re. 22,586 | Spiller et al. | Jan. 2, 1945 |
| 1,739,782 | Christensen | Dec. 17, 1929 |

FOREIGN PATENTS

| | | |
|---|---|---|
| 756,012 | France | Dec. 4, 1933 |
| 117,073 | Sweden | Aug. 20, 1946 |